Aug. 14, 1956  D. F. ALEXANDER  2,759,110
ELECTRICAL GENERATING SYSTEM
Filed Sept. 23, 1950

INVENTOR.
Donald F. Alexander
BY
Willits Hardman and Fehr
attorneys

United States Patent Office 2,759,110
Patented Aug. 14, 1956

2,759,110

ELECTRICAL GENERATING SYSTEM

Donald F. Alexander, Oakwood, Ohio, assignor to General Motors Corporation, Dayton, Ohio, a corporation of Delaware Application September 23, 1950, Serial No. 186,479

8 Claims. (Cl. 307—84)

This invention relates to electrical apparatus and more particularly to regulators for regulating the field strength of shunt and separately excited generators.

In generators having shunt or separately excited fields, it has been customary to regulate the field strength by placing a current control such as a variable pressure resistance of the carbon pile type in series with the field winding. This makes it necessary that the variable resistance be of sufficient capacity to carry the entire field current. The cost of such regulators is comparatively high.

It is an object of my invention to provide a satisfactory system for regulating the field strength of electric generators in which only a relatively small part of the total field current of the generator must be carried by the current control so that only a relatively small current control is required.

It is another object of my invention to provide a satisfactory regulating system in which the field current is divided in such a way that the major portion of the field current is not regulated but a minor portion of the current passes through the current control and is varied to such an extent that the total field strength is properly regulated.

Further objects and advantages of the present invention will be apparent from the following description, reference being had to the accompanying drawings, wherein a preferred form of the present invention is clearly shown.

Figure 1:
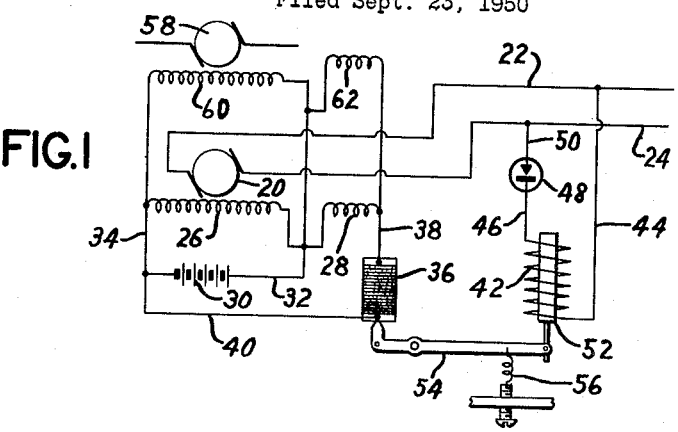
Fig. 1 is a wiring diagram of one form of my invention shown applied to generating means with split field windings responsive to output voltage.

Referring now to the drawings and more particularly to Fig. 1, there is shown diagrammatically a generator 20 which may be used for alternating or direct current. This generator 20 is provided with output conductors 22 and 24. This generator 20 is preferably driven by a substantially constant speed prime mover preferably provided with its own speed regulating means. According to this form of the invention, the generator 20 is provided with a major electromagnetic field winding 26 and a minor electromagnetic field winding 28 connected in parallel circuit relation to the battery 30 or other sources of direct current. For example, as a substitute for the battery current, the field current may be supplied from the output conductors 22 and 24. If these conductors carry alternating current, then half or full wave rectification must be included. The battery 30 is connected by the common conductor 32 to the adjacent terminals of the field windings 26 and 28 while the conductor 34 provides a connection between the second terminal of the field winding 26 and the second terminal of the battery 30.

According to my invention, the entire regulation of the field is accomplished through the control of the current through the minor field winding portion 28. For this purpose, there is connected between the second terminal of the field winding 28 and the second terminal of the battery 30, a current control in the form of a variable pressure resistance 36 of the carbon pile type. This variable pressure resistance is connected by the conductor 38 with the second terminal of the field winding portion 28 and by the conductor 40 with the second terminal of the battery 30.

To maintain the voltage across the output conductors 22 and 24 substantially constant, the variable-pressure resistance 36 is controlled by a regulating system which includes the electromagnet coil 42 connected by the conductor 44 with output conductor 22 and connected by the conductor 46, the rectifier 48 and the conductor 50 with the output conductor 24. The electromagnet coil 42 cooperates with an armature 52 which is pivotally connected to a lever 54 biased by the adjustable spring 56 so that its opposite end applies a pressure to the variable-pressure resistance 36.

According to this arrangement, as the voltage output of the generator 20 rises, the armature 52 will be attracted in increasing amounts to reduce slightly the pressure upon the variable-pressure resistance 36 to provide a corresponding reduction in the current through the minor field portion 28 sufficient to reduce the total field strength of the generator 20 a sufficient amount to reduce the voltage output sufficiently to keep this output substantially at the desired constant voltage. Upon a drop in voltage, the corresponding reverse action will take place. The rectifier 48 insures that only direct current will be applied to the electromagnet coil 42 so that the pull upon the armature will not be subject to alternating current reversal. In this arrangement, the major and minor fields 26 and 28 may be either stationary or rotating and the armature element may be either rotating or stationary and it is not necessary the field termed the minor field be of a lesser value than the field termed the major field.

If desired, there may also be a second generator 58 connected to the same prime mover having its major electromagnetic field winding 60 connected directly across the battery 30 in a manner similar to the major field winding portion 26 of the generator 20. Likewise, the generator 58 may be provided with a minor electromagnetic field winding portion 62 connected in parallel circuit relationship with the minor field winding portion 28 of the generator 20. With this arrangement, the generator 58 will have its field strength regulated in the same manner as the field strength as the generator 20. However, since the regulation of the field strength is in accordance with the voltage of the output conductors 22 and 24 of the generator 20, this voltage will be kept much more constant than the voltage output of the generator 58. By using the generator 20 to supply electrical devices which require a very constant voltage supply, such as electric lighting, and by using the generator 58 to supply electrical devices which do not require such exact voltage regulation, such as heating elements and electric motors, a satisfactory current regulation for both generators is obtained with a relatively small inexpensive carbon pile regulator.

Figure 2:
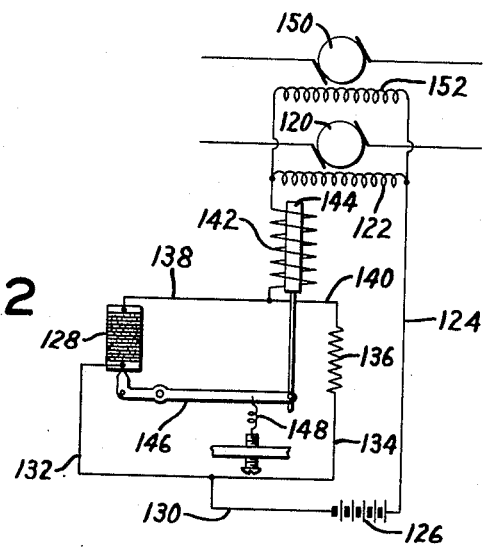
Fig. 2 is a wiring diagram showing another form of my invention shown applied to generating means having constant current regulated single field windings.

In Fig. 2, there is shown a generator 120 having a single electromagnetic field coil 122. The field coil 122 has one terminal connected by the conductor 124 to a source of direct current such as the battery 126, the generator output as explained in connection with Fig. 1. To regulate the current through this single field winding 122 with a current regulator in the form of a variable pressure resistance 128 of the carbon pile type which has a capacity considerably less than the maximum current flow required for the field winding 122, I divide the field winding current so that only a portion of the current passes through the variable resistance pressure 128. To do this, the second terminal of the battery 126 is connected by the conductor 130 to the branch conductors 132 and 134. The conductor 132 connects the conductor 130 with the carbon pile element 128 while the conductor 134 connects the conductor 130 with a fixed resistance 136.

The relative values of the variable pressure resistance 128 and the fixed resistance 136 should be proportioned so that the heat dissipating capacity of the carbon pile element 128 will not be exceeded under any required value of field current. The carbon pile element 128 is connected by the conductor 138 and the fixed resistance 136 is connected by the conductor 140 to the lower terminal of the electromagnet coil 142 which has its second terminal connected directly to the second terminal of the field winding 122 of the generator 120.

With this arrangement, all of the field current passes through the electromagnet coil 142 but the field current is divided between the carbon pile element 128 and the fixed resistance 136 since they are in parallel circuit relation. The electromagnet coil 142 cooperates with an armature 144 which is pivotally connected to a lever 146. This lever 146 is biased by an adjustable spring 148 so that its opposite end applies a pressure to the variable pressure resistance 128. As is well understood, with an increase in compression pressure such variable pressure resistance elements will have a reduced resistance to current flow. In this particular circuit, the armature 144 will be provided with an increasing lifting tendency as a current flow increases through the electromagnet coil 142. Such lifting of the armature 144 will reduce the pressure upon the variable pressure resistance 128 thereby reducing the current flow through the branch circuit containing the variable pressure resistance 128 in an amount sufficient to keep the field current through the field winding 122 constant. If desired, however, instead of the electromagnet coil 142 being connected in series with the field winding 122, it may be connected to the output conductors in the same manner as the electromagnet coil 42 in Fig. 1 through a shunt circuit which includes a rectifier similar to the rectifier 48.

If desired, a second generating means 150 may be driven by the same prime mover as the generating means 120. Such a prime mover preferably should have its own constant speed regulating means. The generating means 150 is provided with the single electromagnetic field winding 152 connected directly in parallel with the field winding 122 and is controlled in a similar manner by the carbon pile variable pressure resistance 128.

Figure 3:
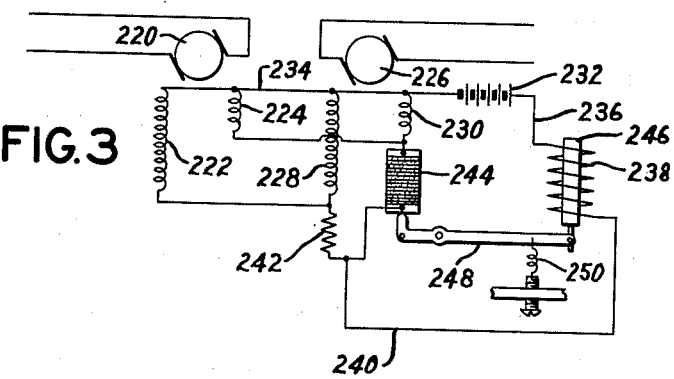
Fig. 3 is a wiring diagram showing another form of my invention applied to generating means having constant current regulated split field windings.

In Fig. 3, there is provided a generating means 220 having a major electromagnetic field winding portion 222 and a minor electromagnetic field winding portion 224. If desired, a second generating means 226 may be driven directly by the same prime mover as the generator 220. Such a prime mover preferably should have its own constant speed regulating devices. This second generator 226 is also provided with a major electromagnetic field winding portion 228 and a minor electromagnetic field winding portion 230. A source of direct current such as a battery 232 or the generator output as explained in Fig. 1, has its one terminal connected by the conductor 234 to one terminal of each of the major and minor field winding portions.

The second terminal of the battery 232 is connected by the conductor 236 with the electromagnet coil 238 which in turn is connected by the conductor 240 to a fixed resistance 242 and a variable resistance element 244 of the carbon pile type which are connected in parallel circuit to each other. The second terminal of the fixed resistance 242 is connected to the second terminal of the major field winding portions 222 and 228 so that the major portion of the field current is carried by the fixed resistance 242. The second terminal of the variable pressure resistance 244 is connected to the second terminals of the minor field winding portions 224 and 230 so that this resistance 244 only carries a minor portion of the total field current.

The total field current however is kept substantially constant by the pull of the armature 246 which is associated with the electromagnet coil 238. This armature 246 is pivotally connected to the lever 248 which is normally biased by the adjustable spring 250 to apply a compression pressure upon the variable-pressure resistance 244. This is opposed by the pull of the armature 246 so as to keep the total field current and total field strength substantially constant. In both Figs. 2 and 3, the field windings may be either rotating or stationary and the armatures may be either stationary or rotating and the effect of the minor field windings may be greater than the major field windings. In each form, the field winding current is divided so that only a fraction passes through the carbon pile element which however is controlled by the voltage or entire field current of one of the generators so as to have the same result as the regulators heretofore used in which all the current passed through the carbon pile variable resistance element.

While the form of embodiment of the invention as herein disclosed, constitutes a preferred form, it is to be understood that other forms might be adopted, as may come within the scope of the claims which follow.

What is claimed is as follows:

1. An electrical generating system having electrical generating means including electromagnetic field means, electrical current supply means for said field means, a plurality of branch circuits connecting the current supply means and the field means to provide a plurality of paths of current flow, a variable resistance connected in series with one of said branch circuits, and electrically energized means responsive to a condition in an output circuit of the generating means for varying the resistance of said variable resistance.

2. An electrical generating system having two separate electrical generating means each including electromagnetic field means, electrical current supply means for said field means, a plurality of branch circuits connecting the current supply means and the field means to provide a plurality of paths of current flow, a variable resistance connected in series with one of said branch circuits, and electrically energized means responsive to the combined current flow in said field means for varying the resistance of said variable resistance.

3. An electrical generating system including electrical generating means including electromagnetic field means, said field means being divided into a major portion and a minor portion, an electrical current supply means, said major and minor portions of said field means being connected in parallel circuit relation with said current supply means, a carbon pile type variable resistance connected in series with the minor portion of said field means, and electrically powered means responsive to a current condition of said generating means for varying the resistance of said carbon pile type variable resistance.

4. An electrical generating system including electrical generating means including electromagnetic field means, said field means being divided into a major portion and a minor portion, an electrical current supply means, said major and minor portions of said field means being connected in parallel circuit relation with said current supply means, a variable resistance connected in series with the minor portion of said field, and electrically powered means responsive to the total current supplied by said current supply means for varying the resistance of said variable resistance.

5. An electrical generating system including electrical generating means including electromagnetic field means, said field means being divided into a major portion and a minor portion, an electrical current supply means, said major and minor portions of said field means being connected in parallel circuit relation with said current supply means, a variable resistance connected in series with the minor portion of said field, and electrically powered means responsive to the output of said generating means for varying the resistance of said variable resistance.

6. An electrical generating system having two separate electrical generating means each including electromagnetic field means, electrical current supply means for all of said field means, a plurality of branch circuits connecting the current supply means and all of the field means to provide a plurality of paths of current flow, a carbon pile type variable resistance connected in series with one of said branch circuits, a fixed electrical resistance connected in series with another of said branch circuits, and electrically energized pressure applying means associated with said generating means for applying a variable pressure to said carbon pile type variable resistance means for varying the resistance of said carbon pile type variable resistance means.

7. An electrical generating system having two separate electrical generating means each including electromagnetic field means, electrical current supply means for all of said field means, a carbon pile type variable resistance and a second resistance of a lower fixed value connected in parallel circuit relation to each other connecting the current supply means and all the field means, and electrically powered pressure applying means connected in series circuit relation with said current supply means and all the field means for applying a variable pressure to said carbon pile type variable resistance means for varying the resistance of said variable resistance means.

8. An electrical generating system having two separate electrical generating means each including electromagnetic field means, electrical current supply means for said field means, a plurality of branch circuits connecting one terminal of the current supply means and one terminal of all of the field means to provide a plurality of paths of current flow, another circuit connecting a second terminal of the current supply means and a second terminal of all of the field means, a variable resistance connected in series with one of said branch circuits, a fixed resistance of lower value in another of said branch circuits and electrically energized means associated with said generating means for varying the resistance of said variable resistance.

References Cited in the file of this patent

UNITED STATES PATENTS

| | | |
|---|---|---|
| 626,713 | Maskowitz | June 13, 1899 |
| 985,109 | Burnham | Feb. 21, 1911 |
| 1,400,502 | Turbayne | Dec. 13, 1921 |
| 1,843,250 | Spencer | Feb. 2, 1932 |
| 1,862,233 | Myer | June 7, 1932 |
| 2,285,654 | Hanna et al. | June 9, 1942 |
| 2,344,311 | Laird | Mar. 14, 1944 |
| 2,383,143 | Moore | Aug. 21, 1945 |
| 2,524,166 | Gartner | Oct. 3, 1950 |
| 2,551,687 | McLain | May 8, 1951 |

FOREIGN PATENTS

| | | |
|---|---|---|
| 13,099 | Great Britain | May 31, 1911 |